United States Patent [19]

Pidorenko et al.

[11] Patent Number: 4,856,317
[45] Date of Patent: Aug. 15, 1989

[54] VACUUM CALIBRATION SYSTEM AND METHOD FOR FIBEROPTIC PRESSURE TRANSDUCER

[75] Inventors: John Pidorenko, Ypsilanti, Mich.; Alan R. Hoffman, Chagrin Falls; Robert F. Hodge, Kent, both of Ohio; Wei-Min Wang, Ypsilanti, Mich.

[73] Assignee: Fiberoptic Sensor Technologies, Inc., Ann Arbor, Mich.

[21] Appl. No.: 189,333

[22] Filed: May 2, 1988

[51] Int. Cl.4 ............................................. G01L 27/00
[52] U.S. Cl. ..................................... 73/4 R; 73/705; 364/571.04; 364/571.07
[58] Field of Search ......................... 73/4 R, 4 V, 705; 364/571, 571.01–571.08

[56] References Cited

U.S. PATENT DOCUMENTS

| | | | |
|---|---|---|---|
| 3,686,958 | 8/1972 | Porter et al. | 73/705 |
| 4,213,462 | 7/1980 | Sato | 356/434 X |
| 4,428,239 | 1/1984 | Johnston | 73/705 |
| 4,446,715 | 5/1984 | Bailey | 73/1 R |
| 4,599,901 | 7/1986 | Hirschfeld | 73/705 |
| 4,678,909 | 7/1987 | Jackson et al. | 73/705 X |
| 4,711,246 | 12/1987 | Alderson | 73/705 X |
| 4,752,141 | 6/1988 | Sun et al. | 73/705 X |
| 4,760,250 | 7/1988 | Loeppert | 250/231 R X |

FOREIGN PATENT DOCUMENTS 2072349 9/1981 United Kingdom ................. 73/705

Primary Examiner—Tom Noland
Attorney, Agent, or Firm—Charles S. McGuire

[57] ABSTRACT

A system and method for initializing and calibrating a fiber optic pressure transducer so that a measured intensity of light which varies as a function of pressure can be accurately translated to the value of pressure which produces that value of light intensity. The transducer includes an enclosed sensor tip having a diaphragm which is exposed to atmospheric pressure on the inside and the pressure to be determined on the outside as measurements are taken, the resulting pressure differential producing a related attenuation in light intensity. Calibration according to the present invention is performed by exposing the diaphragm to atmospheric pressure on the outside and sub-atmospheric pressure on the inside while transmitting light through the fiber in the usual manner. The sub-atmospheric pressure is changed gradually as simultaneous measurements are made of the intensity of light returned through the fiber and the actual value of the sub-atmospheric pressure at a number of discrete times. The paired values are stored in a look-up table which is subsequently used to determine unknown pressures from matched values of measured light intensity.

20 Claims, 2 Drawing Sheets

VACUUM CALIBRATION SYSTEM AND METHOD FOR FIBEROPTIC PRESSURE TRANSDUCER

REFERENCE TO RELATED PATENT

The present application is related to, and commonly assigned with, U.S. Pat. No. 4,711,246, issued Dec. 8, 1987.

BACKGROUND OF THE INVENTION

The present invention relates to fiber optic pressure transducers, and more specifically to systems for accurately calibrating such devices to correlate the value of pressure being measured to the intensity of light transmitted through an optical fiber.

Pressure measurements are made in a variety of applications by means of fiber optic pressure sensors in which a movable portion of a sensing tip at the end of a hollow tube is deformed or deflected in accordance with the pressure differential on opposite sides thereof. One or more optical fibers extend through the tube and carry light from a source outside the tube to a reflecting surface inside the sensing tip, and thence back through the fiber(s) to means for measuring the intensity of the reflected light. Means are provided in the sensing tip for attenuating the light intensity in accordance with the pressure differential, whereby the measured intensity of the light returned through the fiber(s) may be translated into a measurement of the pressure at the sensing tip.

The foregoing presupposes, of course, that the relationship between measured light intensity and pressure is known over the range of pressures to be measured. This necessitates some manner of initialization and calibration of the system in order that the pressure exerted upon a given sensor tip may be properly correlated with the measured intensity of reflected light.

It is an object of the present invention to provide an accurate system for initializing and calibrating a fiber optic pressure transducer having a sensor tip with light attenuating means related to pressure differential inside and outside the tip.

A further object is to provide such a calibration system which is economical in cost and simple to operate.

Another object is to provide a system which permits sensor tips of a fiber optic pressure measurement system to be individually calibrated in terms of the pressure-light intensity relationship in a short time.

The principal object is to provide a fiber optic pressure sensing tip calibration system having all of the foregoing advantages, i.e., accuracy, economy, simplicity and speed of operation.

Other objects will in part be obvious and will in part appear hereinafter.

SUMMARY OF THE INVENTION

In accordance with the foregoing objects, the invention contemplates an initialization and calibration system which utilizes a microprocessor to generate and store a digitized look-up table tailored to each individual sensor tip to be used as part of a fiber optic pressure measurement system. The measurement system is of the type wherein one or more optical fibers extend from a first end, into which a light of known intensity is directed, through a flexible, hollow tube to a second end positioned within a sensor tip attached to the end of the tube. The sensor tip forms an enclosed chamber, the inside of which is maintained at atmospheric or other known pressure, and the outside of which is exposed to a pressure to be measured. At least a portion of the light transmitted through the fiber(s) is reflected by means within the sensor tip back to and through the fiber(s). The intensity of the reflected light is attenuated to an extent related to the pressure on the outside of the sensing tip, whereby the intensity of the light which passes back through the fiber(s) to the first end thereof may be measured to provide an indication of the pressure to be measured. The reflected light may be transmitted back through the same fiber or through a different fiber to the measuring means.

Fiber optic pressure measurement systems of this type have been successfully used for some time in applications wherein the location of the pressure to be measured is not easily accessible. These include, but are by no means limited to, the measurement of blood pressure within a functioning human heart, or other places within the cardio-vascular system. In such applications, the hollow tube with the sensing tip at the distal end serves as a catheter, being passed through a vein or artery to position the tip at the desired point of pressure measurement. Accordingly, the term "catheter" is sometimes applied to portions of the pressure measurement system of the invention for illustrative purposes in connection with a typical application thereof.

In the calibration system of the invention, the tube carrying the optical fiber(s) is connected to one side of a fitting, the other side of which is connected to an optical coupler including a beam splitter for directing light into and recovering reflected light from the proximal end(s) of the fiber(s). The fitting provides an enclosed housing, the interior of which communicates through a second hollow tube with a vacuum pump, such as one end of a hollow cylinder wherein a spring-loaded piston or plunger is disposed. The end of the cylinder is also connected, via a third hollow tube, to a high accuracy pressure transducer which converts gas pressure communicated to the transducer to an electrical signal.

The piston is advanced in the cylinder to expel air therefrom and the spring force tending to move the piston in the opposite direction produces a vacuum (i.e., a sub-atmospheric or negative gauge pressure) in the one end of the cylinder. The vacuum is communicated through the second tube, fitting and first tube to the interior of the sensing tip, the outside of which is exposed to atmospheric pressure. The vacuum is also communicated through the third tube to the pressure transducer, and thus converted to an electrical signal.

The end of the cylinder is also attached to a leak valve or metering orifice which permits air to enter at a limited rate. Thus, as the spring moves the piston within the cylinder, the vacuum in the one end thereof gradually decreases from its initial value until the pressure is restored to atmospheric. As this takes place, e.g., over a time period of a few seconds, light is transmitted through the fiber(s) to the sensing tip and the intensity of reflected light is measured, i.e., is converted by a photo diode to an electrical signal.

Thus, the system provides two electrical signals, concurrent in time over a range of values, one commensurate with the actual pressure differential across the sensor tip and the other with the intensity of light reflected back through the optical fiber(s). These electrical signals are provided to a micro processor which generates a digital look-up table matched to the specific sensor tip, establishing the actual correspondence of pressure differential and measured light intensity over the desired range for that sensing tip. The process is repeated for each tip used in the pressure measurement system.

DETAILED DESCRIPTION

The present invention is applicable to a variety of fiber optic pressure measurement systems of the type having the following elements and characteristics: 1. one or more optical fibers extending from a proximal end through a hollow tube to a distal end within an enclosed sensing tip; 2. means for directing light of known intensity through the fiber(s) from the proximal to and through the distal end; 3. reflecting means within the sensor tip for directing at least a portion of the light back through the fiber(s) to the proximal end; and 4. means for attenuating the intensity of the reflected light as a function of the pressure differential across the outside and inside of the sensor tip. An example of such a fiber optic pressure sensing system is disclosed in U.S. Pat. No. 4,711,246, assigned to the assignee of the present application, which also includes a general description of the initialization and calibration system of the present invention.

Figure 1:
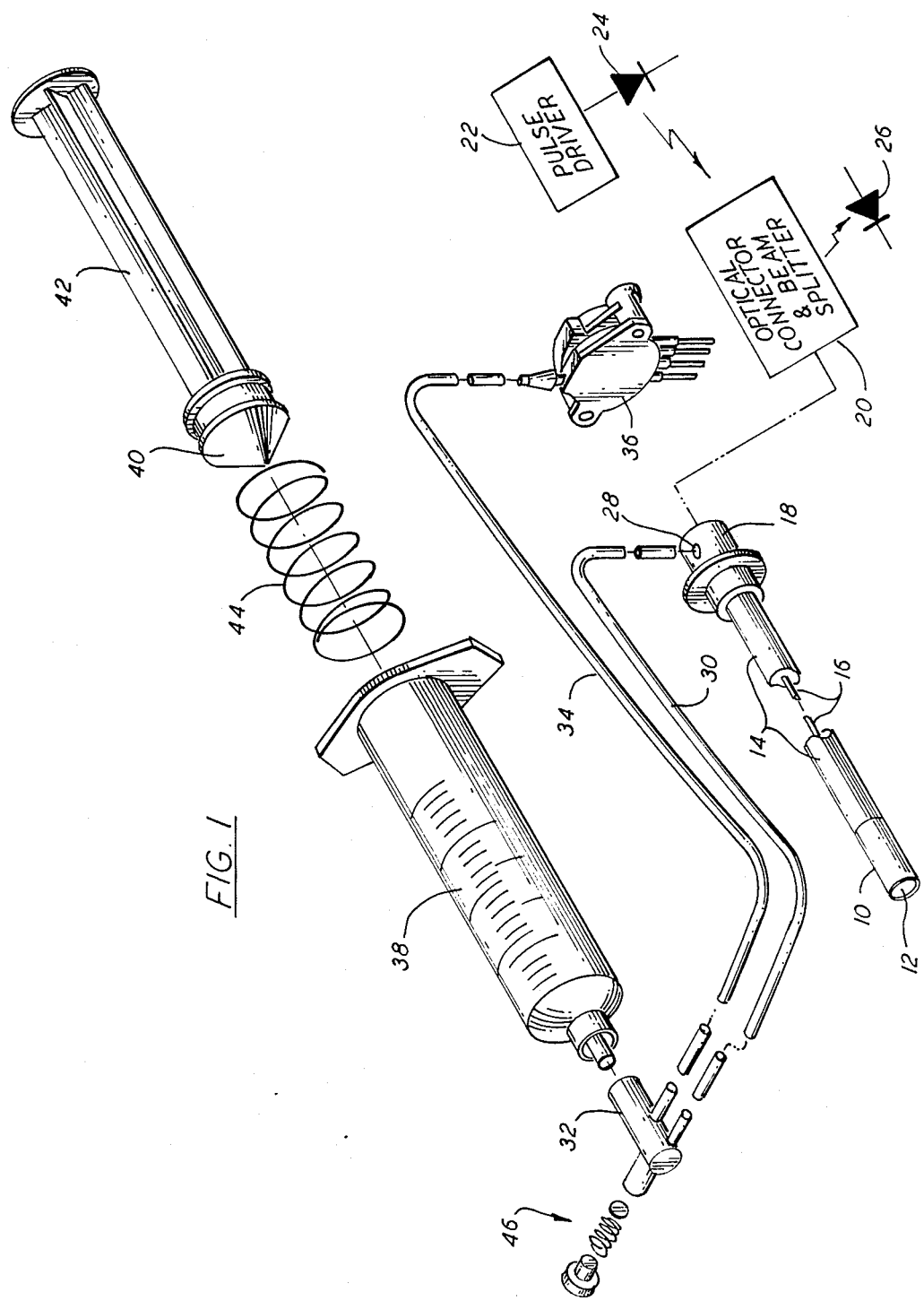
FIG. 1 is a perspective view of an illustrative form of certain elements of the initialization and calibration system of the invention, shown partially in block diagram and schematic form.

Mechanical elements of an illustrative embodiment of the pressure measurement and calibration system are shown in FIG. 1, including catheter tip 10 having pressure-deformable diaphragm 12 positioned on the end thereof. Tip 10 is hollow and is connected, at the end opposite diaphragm 12 to hollow surgical tubing 14. Optical fiber 16, or a plurality of such fibers, extends through tubing 14, into tip 10 and terminates at an end portion positioned in predetermined relation to diaphragm 12. Tubing 14 is connected at the end opposite its connecton to tip 10 to fitting 18 which in turn is connected to a suitable optical connector and beam splitter indicated diagrammatically at 20.

Pulse generator 22 drives LED 24 to emit short pulses of very high intensity light in known fashion. The portion of the light pulses which pass through connector and splitter 20 travel along fiber 16. The light rays which exit the end of the fiber are reflected by the inner surface of diaphragm 12 and, depending upon the angle of reflection, either pass back into and through fiber 16 in the opposite direction or are "lost," i.e., reflected outside the fiber. Since diaphragm 12 is deformable as a function of the pressure differential on opposite sides thereof, and since the amount of light reflected back into and through fiber 16 is a function of the degree of deformation, measurement of the intensity of light which has passed back through fiber 16, e.g., by means of photodiode 26, provides an accurate means of measuring the pressure differential across diaphragm 12. Although the elements just described are representative of the type of pressure measurement system wherein the present invention may be employed, it will be understood that the calibration method is applicable to a wide variety of apparatus having the features set forth at the beginning of this section.

The foregoing pressure measurement scheme is entirely dependent, of course, on establishing a known relationship between pressure differential and light intensity. Since this relationship is not necessarily linear nor consistent from one catheter tip (diaphragm) to another, it is desireable that the calibration scheme be adapted to establish the pressure differential-light intensity relationship accurately for each device prior to use. Since the relationship is typically very non-linear, an effective calibration method is to generate look-up table for each device. A typical look-up table is a paired listing of mutually dependent numbers, much like a logarithm or trig function table. As employed in the present invention, a pressure differential over a given range, e.g., from 0 to 300 mm Hg, is applied across the diaphragm and measured while at the same time measuring the intensity of light reflected back through the fiber. The actual, measured value of pressure differential may then be paired with the simultaneously measured value of light intensity at each increment, e.g., one mm Hg, over the desired range. When that particular catheter tip is thereafter used to measure unknown pressure values, the measured value of light intensity is simply paired with the corresponding pressure value from the look-up table.

Implementation of the foregoing procedure according to the invention, with a number of preferred refinements, will now be explained with reference to the drawings. Fitting 18 is provided with opening 28 to which one end of hollow, flexible tubing 30 is connected, the other end being similarly connected to hollow enclosure 32. Tubing 34 is connected at opposite ends to enclosure 32 and to high accuracy pressure transducer 36, preferably the type having a silicon diaphragm and adapted to convert a pressure to an analog voltage.

Enclosure 32 is assembled in essentially air-tight communication with one end of cylinder 38. Piston 40, on one end of plunger 42, sealingly engages the interior of cylinder 38 and is biased by spring 44 toward an outward position. A spring loaded leak valve, indicated generally by reference numeral 46, is provided on one side of enclosure 32 to permit air to enter at a controlled rate when the pressure within enclosure 30 is reduced to a level below the atmospheric pressure outside the valve. Thus, with the described arrangement, plunger 42 may be depressed (manually or by automatically actuated mechanical means, not shown) to move piston 40 against the biasing force of spring 44 to a position near the lower end of cylinder 38. Upon release of the plunger, spring 44 will move piston 40 outwardly, creating a sub-atmospheric pressure in enclosure 30.

The negative gauge pressure in enclosure 32 is communicated via tubing 30 and 34 to one side of each of diaphragm 12 and the diaphragm of transducer 36, respectively. The spring constant or other physical features of spring 44 are not important; it is only necessary that the biasing force on piston 40 be strong enough to provide a negative gauge pressure at least as great as the desired measuring limit, e.g., 300 mm Hg. As soon as the maximum negative gauge pressure is reached, air begins to enter enclosure 32 at a controlled rate through valve 46 gradually reducing the pressure differential across the diaphragms of catheter tip 10 and transducer 36 until pressure equilibrium, i.e., zero differential, is reached. Other, known forms of vacuum pumps and metering orifices may, of course, be substituted for the illustrated apparatus to provide the described functions.

Figure 2:
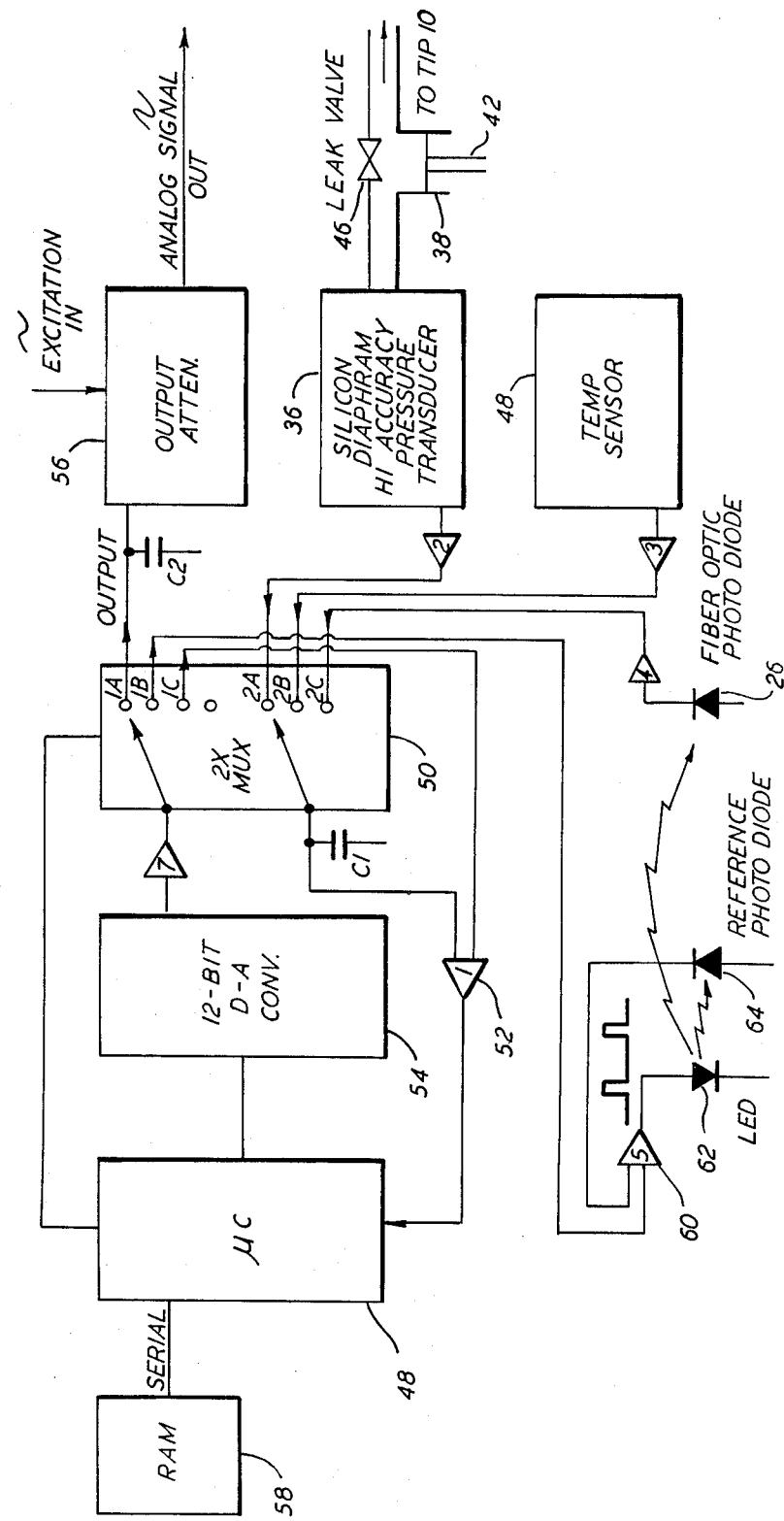
FIG. 2 is a partly schematic block diagram illustrating operation of the initialization, calibration and operation of the fiber optic pressure measurement system.

The electronic components through which initialization and calibration, as well as operation, of the pressure measurement system are performed according to the invention are shown in block diagram form in FIG. 2. Upon application of excitation voltage microcomputer 48 automatically resets and initializes in known manner. The outputs of transducer 36 and temperature sensor 50, which measures and generates an electrical signal commensurate with the temperature of the circuitry for compensation purposes, as well as photodiode 26, all appropriately amplified, are connected to MUX 50. The outputs from MUX 50 are sequentially sampled by microcomputer 48 through comparator 52. Microcomputer 48 corrects the signal from transducer 36 for temperature coefficient and computes and stores the aforementioned look-up talbe, i.e., a sequence of the values of signals generated by photodiode 26 paired with the corresponding pressure signal values from trandsuder 36 at, e.g., intervals of 1 mm Hg.

Microcomputer 48 is connected to a second section of MUX 50 through D to A converter 54, and thence to output altenuator 56. RAM 58 stores the correction data for transducer 36, D to A converter 54, temperature sensor 48, offsets, and output attenuator 56. Microcomputer 48 is programmed to recognize various conditions which would indicate possible incorrect calibration and to transmit a signal in response thereto to operational amplifier 60, driving LED 62. The light from LED 62 is picked up both by monitor photodiode 64 and fiber optic photodiode 26 and the problem is indicated by a square wave on the monitor.

After initialization and calibration in the manner described, microcomputer 48 automatically shifts to the measuring mode. The pressure differential on opposite sides of diaphragm 12 is reversed during use, of course, from that applied to generate the look-up table. That is, while the outside of the diaphragm is at atmospheric pressure and a partial vacuum or negative gauge pressure is applied to the inside during calibration, the inside is at atmospheric pressure and the outside is exposed to the positive pressure to be measured during actual use. However, the same pressure differential will produce the same refelected light intensity and thus the values in the look-up table will accurately indicate the pressure on diaphragm 12 which results in the measured value of reflected light intensity. If desired, tubing 30 may be removed from fitting 18 during measurements to insure that the interior of tip 10 will be at atmospheric pressure, although this will normally not be necessary since atmospheric equilibrium should be reached through valve 46 after calibration is completed.

Microcomputer 48 samples he signals from fiber optic photodiode 26 and temperature sensor 48 and routes the signals to output attenuator 56, e.g., at 300 samples per second. Capacitors C1 and C2 function as sample and hold capacitors. Attenuator 56 modulates the excitation voltage to provide an accurate replica of the excitation to the input of the monitor at the standard 5 microvolts per mm Hg per volt of excitation. The output of LED 24 is measured by reference photodiode 64 which compensates for changes in LED output with time and temperature.

Microcomputer 48 uses double precision math which, combined with 12 bit conversion, allows for a wide tolerance range in the manufacture of the disposable part (sensor tip 10) of the unit, e.g., 20%, thereby greatly reducing manufacturing cost. This approach requires the previously described calibration system of the invention by which the microcomputer constructs a calibration curve or look-up table unique to each sensor tip just prior to its use. This not only permits the disposable tips to be manufactured to relatively wide tolerances, but also negates the effect of possible long term instability caused, for example, by extreme temperature exposure. that is, if the sensor tips were exposed to high temperatures for an extended period of time after being calibrated, a zero drift in the sensor tip signal response could result. Such effects are negated by a system whereby the disposable sensor tip is calibrated over its entire range just prior to use.

What is claimed is:

1. In a fiber optic pressure measurement system having one or more optical fibers extending from a proximal end to a distal end within an enclosed sensor tip, means for directing light of known intensity through the fiber(s) from the proximal to and through the distal end, reflecting means within the sensor tip for directing at least a portion of the light back through the fiber(s) to the proximal end, and means for attenuating the intensity of the reflected light as a function of the pressure differential across the outside and inside of the sensor tip, means for calibrating the measurement system to establish a known relationship between the intensity of reflected light and pressure differential the calibrating means comprising:
    (a) means for applying a pressure differential across the outside and inside of said sensor tip;
    (b) means for varying said pressure differential continuously from a first to a second value over a time period;
    (c) means for measuring the value of said pressure differential at a plurality of discrete times during said time period;
    (d) means for measuring the value of the intensity of reflected light at said plurality of discrete times; and
    (e) means for storing said measured values of pressure differential and intensity of reflected light, whereby a known pressure value may be determined after calibration of the pressure measurement system by matching a measured value of reflected light intensity with the corresponding stored value of pressure differential.

2. The invention according to claim 1 wherein said means for applying a pressure differential comprise means for reducing the air pressure within said sensor tip, whereby the inside of said sensing tip is at a pressure less than atmospheric.

3. The invention according to claim 2 wherein said means for reducing air pressure comprise a cylinder having one end in essentially air-tight communication with the inside of said sensor tip.

4. The invention according to claim 3 wherein said means for reducing air pressure further comprise a piston movable toward said one end and means biasing said piston for movement away from said one end with a force at least great enough to produce said first value of pressure differential.

5. The invention according to claim 2 wherein said first pressure differential is larger than said second pressure differential.

6. The invention according to claim 5 wherein said first pressure differential is at least as great as the maximum pressure differential to be measured by said transducer system.

7. The invention according to claim 6 wherein said first pressure differential is at least about 300 mm Hg.

8. The invention according to claim 6 wherein said means for varying said pressure differential comprises a metering orifice in communication with the inside of said sensor tip to permit controlled entry of air into said sensor tip over said time period.

9. The invention according to claim 8 wherein said first pressure differential is at least about 300 mm Hg and said second pressure differential is substantially zero.

10. The invention according to claim 6 wherein said means for measuring the value of said pressure differential comprises a high accuracy pressure transducer communicating with the inside of said sensor tip.

11. The invention according to claim 10 wherein said means for reducing air pressure comprise a cylinder having one end in essentially air-tight communication with both the inside of said sensor tip and said pressure transducer, and a piston movable away from said one end to reduce the air pressure in said one end and thus in the inside of said sensor tip and said pressure transducer.

12. The method of calibrating a pressure measurement system of the type having one or more optical fibers for conducting light from a proximal to a distal end within an enclosed sensor tip reflecting means within the sensor tip for directing at least a portion of the light back through the fiber(s) to the proximal end, and means for attenuating the intensity of the reflected light as a function of the pressure differential across the outside and inside of the sensor tip, said method comprising:
   (a) directing light of known intensity through the fiber(s) from the proximal to the distal end;
   (b) applying a pressure differential of a first magnitude across the inside and outside of the sensor tip;
   (c) continuously varying said pressure differential from said first magnitude to a second magnitude over a time period;
   (d) measuring the value of said pressure differential at a plurality of discrete times during said time period;
   (e) measuring the value of the intensity of light reflected back to the proximal end of the fiber(s) at said discrete times, thereby providing a plurality of values of pressure differential matched with corresponding values of reflected light intensity; and
   (f) storing said plurality of matched values, whereby an unknown value of pressure differential may be determined after calibration by matching a measured value of reflected light intensity with the corresponding stored value of pressure differential.

13. The method of claim 12 wherein said values of pressure differential and reflected light intensity are simultaneously sampled at said discrete times, and stored in a microcomputer.

14. The method of claim 13 wherein said pressure differential is applied by exposing the outside of said sensor tip to atmospheric pressure and the inside to a pressure below atmospheric.

15. The method of claim 14 wherein said pressure differential is applied by connecting vacuum pump means in essentially air-tight engagement with the inside of said sensor tip, thereby creating a pressure below atmospheric pressure in said one end and said sensor tip.

16. The method of claim 15 and further including connecting said vacuum pump means in essentially air-tight engagement with a high accuracy pressure transducer by which said pressure differential is measured during said time period.

17. The method of claim 16 wherein said pressure differential is varied by permitting air to enter said one end of said cylinder at a controlled rate during said time period.

18. The method of claim 17 wherein said first and second magnitudes are at least about 300 mm Hg and substantially zero, respectively.

19. The method of claim 14 wherein the fiber(s) extend through a length of hollow tubing and the sensor tip is removably secured in essentially air-tight engagement with the distal end of said tubing.

20. The method of claim 19 and further including placing the system in use to measure unknown pressures substantially immediately upon completion of said calibration steps.

* * * * *